Feb. 6, 1962 L. G. CALLEGARI 3,019,950
PUNCTURED CAN SEAL AND SPOUT
Filed March 31, 1959 2 Sheets-Sheet 2

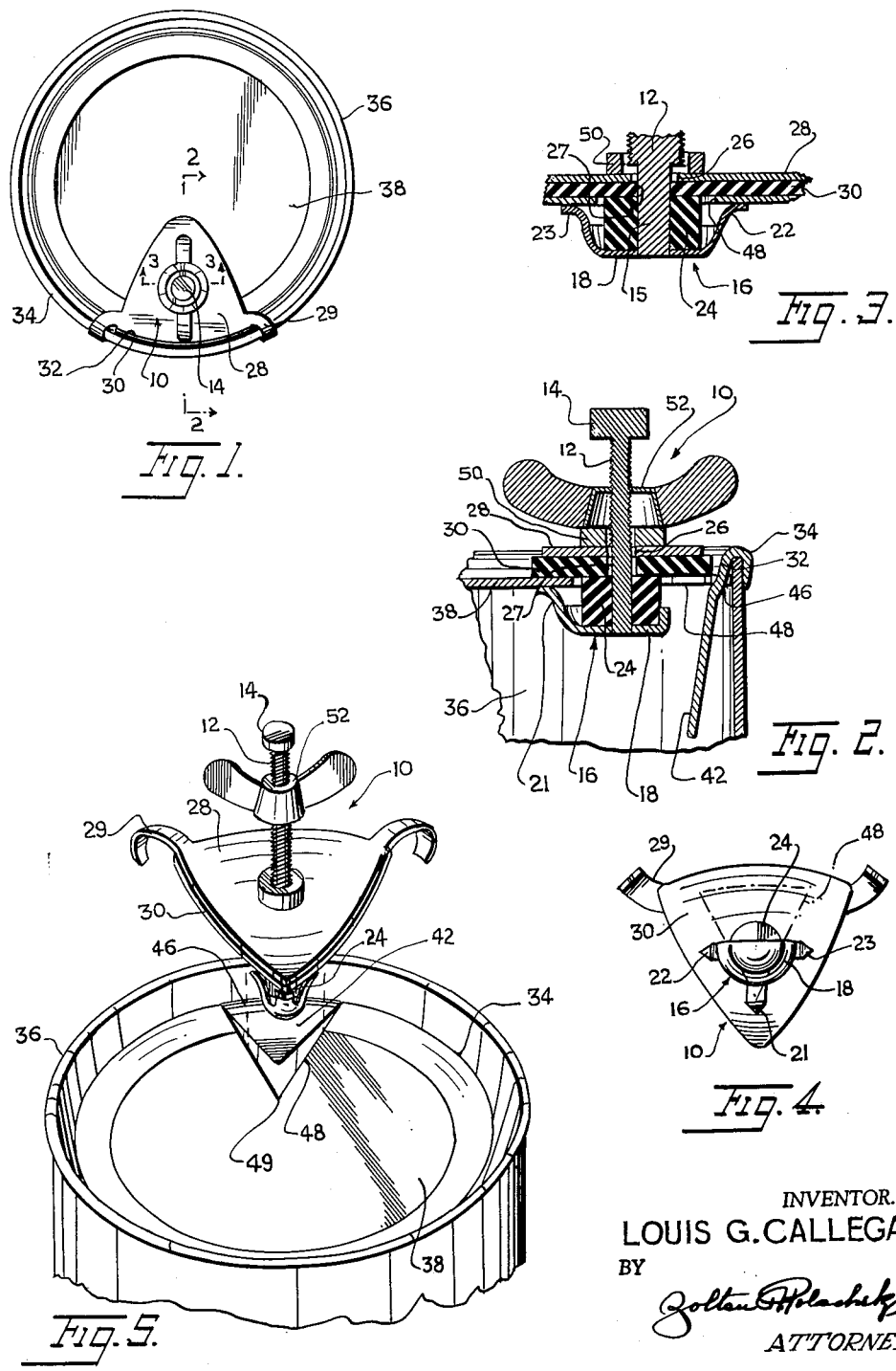

INVENTOR.
LOUIS G. CALLEGARI
BY
ATTORNEY

United States Patent Office 3,019,950
Patented Feb. 6, 1962

3,019,950
PUNCTURED CAN SEAL AND SPOUT
Louis G. Callegari, 34—06 45th St.,
Long Island City, N.Y.
Filed Mar. 31, 1959, Ser. No. 803,150
2 Claims. (Cl. 222—542)

This invention relates to the art of sealing devices and particularly concerns a novel device for sealing a triangular opening in a can containing a beverage or the like.

According to the invention, there is provided a sealing device including a triangular sealing plate provided with a resilient facing. Through the plate and facing passes a rod having a threaded portion and a knob handle. On the threaded portion is a wing nut and washer. On the end of the rod is secured a clamping member having three angularly disposed fingers adapted to engage the underside of a punctured can to be sealed. The sealing plate is provided with two outwardly extending fingers adapted to engage on the rim of the punctured can. The device is especially adapted to seal a triangular opening in a can of beer, fruit juice, or the like such as is made by a conventional opener for cans containing beverages and other fluids. In a modified form of the device, the rod is provided with an axial passage which is closed by the knob handle. The knob handle is removable to open the passage for releasing pressure and serving as a pouring spout.

It is therefore a principal object of the invention to provide a sealing device for a triangular opening in a beverage container.

It is a further object to provide a screw plug adapted especially to seal a triangular openng in a flat top of a cylindrical can, the plug being provided with fingers for engaging a bead on the rim of the can.

It is a still further object to provide a device of the character described with means for releasing pressure and serving as a pouring spout.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a top plan view of the device embodying the invention mounted on and sealing a can.

FIGS. 2 and 3 are sectional views taken on lines 2—2 and 3—3 of FIG. 1.

FIG. 4 is a bottom plan view of the device per se.

FIG. 5 is a perspective view of the device in position for being mounted in the triangular opening at the top of a punctured can.

Figures 6, 7:
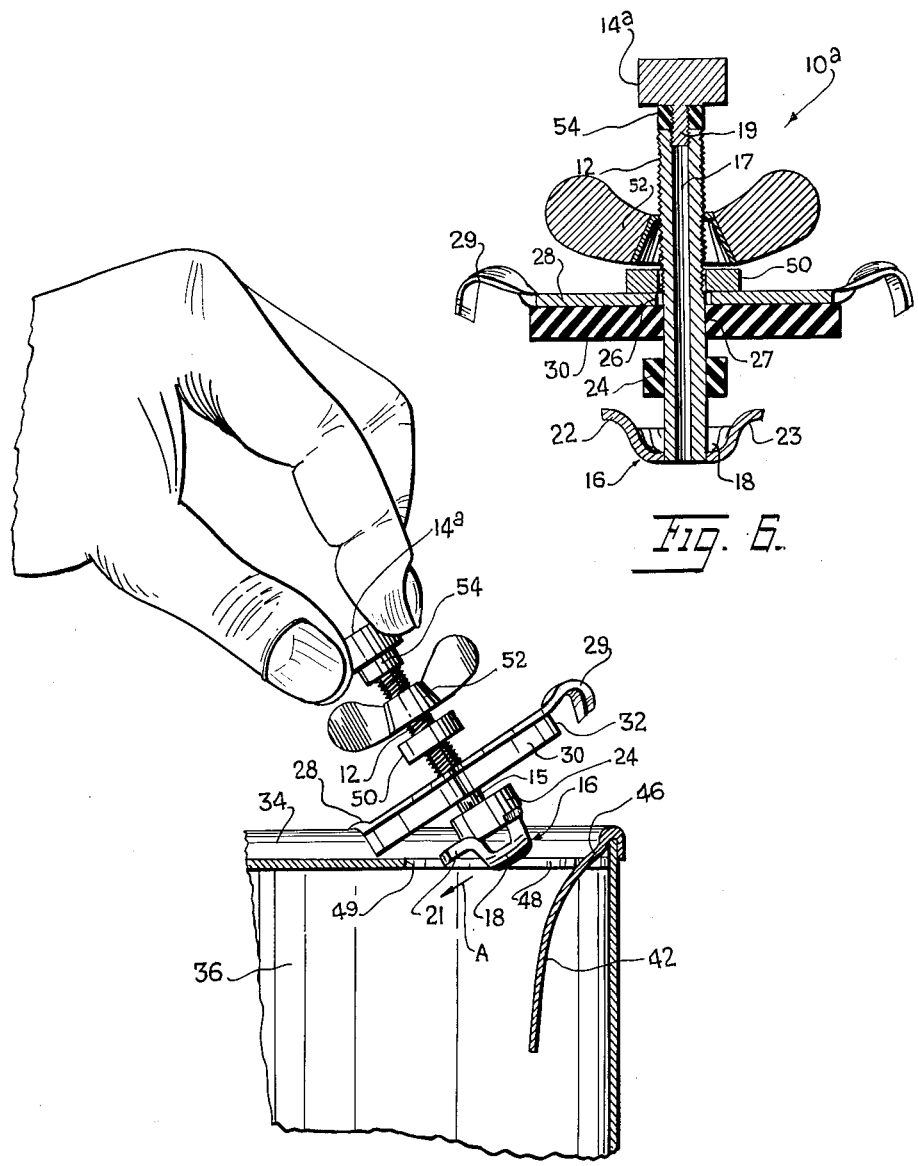
FIG. 6 is a sectional view on an enlarged scale showing a modification of the invention.
FIG. 7 is an elevational view of the device showing it partially inserted in a can.

Referring to FIGS. 1–5, there is shown a sealing device 10 including a threaded rod or shank 12. One end of the shank is formed with a knob handle 14 and the other end is secured to a clamping member 16. This member includes a hollow shell-like body 18 having three radially extending fingers 21–23. The fingers are curved radially outwardly to terminate in a common plane perpendicular to the axis of shank 12. A rubber washer 24 is mounted on the shank and is adapted to seat within the shell.

The shank passes through a narrow rectangular slot 26 in a generally triangular sealing plate 28 and a registering slot 27 in gasket 30. Plate 28 is a rigid member made of metal. At the underside of the plate is the similarly triangular sealing facing or gasket 30 formed of resilient material such as rubber. The gasket has an outer curved edge 32 adapted to engage snugly up against the inner side of the annular rim 34 of a cylindrical can 36. The can is punctured at its circular top 38 with a triangular opening 48 having its base end near the rim and its apex 49 disposed radially inward therefrom. A metal flap or tongue 42 is pressed inwardly from the top 38. The opening may be formed with a narrow ledge 46 to improve the sealing thereof when the device is mounted on the top of the can. A metal washer 50 is disposed on the shank, and between the washer 50 and the knob handle 14 is a wing nut 52. The washer prevents the wing nut from engaging the plate 28 when the wing nut is turned to press the plate 28 and gasket 30 into sealing position over the opening 48 in the top of the can. The shank is made with a narrow end portion 15 which is engaged in the narrow slot 26 so that neither the shank 12 nor the member 16 is rotatable with respect to plate 28. This insures that the point of prong or finger 21 extends in the same vertical plane as the apex of plate 28 while the points of fingers 22, 23 are disposed in the same vertical plane with the axis of the shank. Plate 28 has two outwardly extending arcuate fingers 29 formed near the base end thereof for engaging over the rim 34 of the can.

In the form 10ª of the invention shown in FIGS. 6 and 7, the knob handle 14ª has a threaded stud 19 removably inserted in a threaded end of bore 17 formed in the shank 12. The bore extends axially through the shank and opens at its other end. A ring gasket or washer 54 is employed to seal the bore when the knob is securely seated in the bore.

To use the devices 10 or 10ª, it is only necessary to insert the clamp member through the opening in top 38 of the can. By moving the clamp member inwardly as indicated by arrow A in FIG. 7, the fingers 21–23 will engage just beyond the apex of opening 48 and at the sides thereof, while the fingers or hooks 29 will engage on the rim 34. When the wing nut 52 is tightened, the plate 28 and its gasket 30 will seal the opening. The washer 24 will be pressed between the body of member 16 and the underside of gasket 30 through the opening 48 as shown in FIGS. 2 and 3. There is thus accomplished an effective seal of the openings.

If it is desired to dispense fluid from the can without removing the device 10ª therefrom, the knob 14ª can be removed to open the bore 17. If desired, two such devices 10ª may be used in two diametrally spaced triangular openings on top 38. The knob 14ª of one of the sealing devices may be removed to provide an air inlet while the knob 14ª of the other device may be removed to provide an outlet for the fluid. The shank 12 of the latter device will then serve as a pouring spout.

The device described fulfills a long felt need for a means for sealing a can which has been punctured with a triangular opening. While various types of plugs for sealing holes in various kinds of containers have been known heretofore, none has been especially adapted to serve as a can sealer and none has had the convenience features, simplicity, durability, and effectiveness provided by the present device.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A sealing device for a cylindrical can having a circular top with a triangular opening near the periphery thereof, comprising a generally triangular plate larger in size than said opening, a resilient triangular gasket juxtaposed to said plate, said plate and gasket having registering slots, a threaded shank passing through the registering slots in said plate and gasket, a nut threaded on said shank at one end thereof beyond said plate, a clamping member, said member having a body secured to the other end of the shank, said member having a plurality of radially extending curved fingers adapted to engage at the underside of the top of the can, said one end of the shank being formed with a knob handle, a resilient washer disposed on said shank between said gasket and said member, a metal washer disposed on said shank between said nut and said plate, said other end of the shank being formed with a portion of reduced width, said slots in the plate and gasket plate being rectangular and slidably receiving said portion of the shank of reduced width to prevent turning thereof, said plate having two outwardly extending curved fingers thereon adapted to engage on the outside of the can, said member having a shell-like body adapted to receive said resilient washer therein with one side of the resilient washer held in abutment with said gasket through said opening in the top of the can, said gasket having a curved wide edge extending beyond said plate for abutting an annular rim at the top of the can, said shank having an axial bore extending therethrough, said bore having a threaded end, said knob handle having a stud removably threaded in said end of the bore, whereby the interior of the can and the exterior thereof communicate through said bore when the knob handle is removed, and a resilient sealing ring disposed on the stud between the knob handle and shank.

2. A sealing device for a cylindrical can having a circular top with a triangular opening near the periphery thereof, comprising a generally triangular plate larger in size than said opening, a resilient triangular gasket juxtaposed to said plate, said plate and gasket having registering slots, a threaded shank passing through the registering slots in said plate and gasket, a nut threaded on said shank at one end thereof beyond said plate, a clamping member, said member having a body secured to the other end of the shank, said member having a plurality of radially extending curved fingers adapted to engage at the underside of the top of the can, said one end of the shank being formed with a knob handle, a resilient washer disposed on said shank between said gasket and said member, a metal washer disposed on said shank between said nut and said plate, said other end of the shank being formed with a portion of reduced width, said slots in the plate and gasket plate being rectangular and slidably receiving said portion of the shank of reduced width to prevent turning thereof, said plate having two outwardly extending curved fingers thereon adapted to engage on the outside of the can, said member having a shell-like body adapted to receive said resilient washer therein with one side of the resilient washer held in abutment with said gasket through said opening in the top of the can, said gasket having a curved wide edge extending beyond said plate for abutting an annular rim at the top of the can, said shank having an axial bore extending therethrough, said bore having a threaded end, said knob handle having a stud removably threaded in said end of the bore, whereby the interior of the can and the exterior thereof communicate through said bore when the knob handle is removed, and a resilient sealing ring disposed on the stud between the knob handle and shank, one of the curved fingers on said member being curved in a first vertical plane passing through the axis of said shank and apical ends of said plate and gasket, two other curved fingers of said member being curved in another vertical plane perpendicular to the first vertical plane and passing through the axis of said shank, said one finger engaging at the underside of the said top of the can just beyond the apex of the triangular opening while the two other curved fingers engage at the sides of said triangular opening, said gasket having a curved wide edge extending beyond said plate for abutting an annular rim at the top of the can.

References Cited in the file of this patent
UNITED STATES PATENTS

| | | |
|---|---|---|
| 141,229 | Matthews | July 29, 1873 |
| 268,473 | Fagan et al. | Dec. 5, 1882 |
| 494,702 | Drury | Apr. 4, 1893 |
| 1,172,644 | Trester | Feb. 22, 1916 |
| 1,419,237 | Dietz | June 13, 1922 |
| 1,587,934 | Bartlett | June 8, 1926 |
| 1,636,135 | Hughes | July 19, 1927 |
| 2,249,082 | Jenkins | July 15, 1941 |
| 2,354,069 | Shields | July 18, 1944 |
| 2,500,531 | Eger | Mar. 14, 1950 |
| 2,776,778 | Valvano | Jan. 8, 1957 |